(12) United States Patent
Amrany et al.

(10) Patent No.: US 6,281,829 B1
(45) Date of Patent: Aug. 28, 2001

(54) MULTI-MODE ANALOG FRONT-END

(75) Inventors: Daniel Amrany, Ocean Township; Arnold Muralt, Fairhaven; Frode Larsen, Tinton Falls; Sam Olu George, Lakewood; Nianxiong Tan, Howell; Min Shen, Ocean; Peter D. Keller, Tinton Falls; Jung-Lung Lin, Holmdel, all of NJ (US)

(73) Assignee: Globespan, Inc., Red Bank, NJ (US)

( * ) Notice: Subject to any disclaimer, the term of this patent is extended or adjusted under 35 U.S.C. 154(b) by 0 days.

(21) Appl. No.: 09/384,672

(22) Filed: Aug. 27, 1999

Related U.S. Application Data

(60) Provisional application No. 60/098,276, filed on Aug. 28, 1998.

(51) Int. Cl.$^7$ ............................................. H03M 1/00
(52) U.S. Cl. ............................................. 341/155; 375/219
(58) Field of Search .......................... 341/155; 375/219, 375/222

(56) References Cited

U.S. PATENT DOCUMENTS 4,972,436 * 11/1990 Halim et al. .................... 375/28
5,457,456 * 10/1995 Norsworthy ..................... 341/143
5,512,898 * 4/1996 Norsworthy et al. ............. 341/155
6,067,316 * 5/2000 Amrany et al. ................... 375/220

* cited by examiner

Primary Examiner—Howard L. Williams
(74) Attorney, Agent, or Firm—Thomas, Kayden, Horstemeyer & Risley

(57) ABSTRACT

In general, the multi-mode analog front-end provides an internal line driver and hybrid, as well as numerous functions, in order to provide a close to optimum solution for all digital subscriber line applications. The functions provided for by the analog front-end include; programmable hybrid attenuation; onboard amplifiers for driving external transmit and receive filters; a line driver with programmable drive and gain; programmable RC-filters capable of calibration via an internal loop-back under digital control; a programmable switched-capacitor filter for tracking the over sampling rate used by a digital signal processor; internal testing functions; a high frequency boost circuit; a dual input peak detector; selectable data rates; and a programmable data interface. The analog front-end allows for use of particular blocks within the analog front-end particular to the functions necessary to compensate for a particular digital subscriber line application.

14 Claims, 2 Drawing Sheets

MULTI-MODE ANALOG FRONT-END

CROSS-REFERENCE TO RELATED APPLICATIONS

This application claims the benefit of U.S. Provisional Application Ser. No. 60/098,276, filed on Aug. 28, 1998, and entitled "Novel Multi Mode ADSL Analog Front End," which is incorporated by reference herein in its entirety.

FIELD OF THE INVENTION

The present invention generally relates to analog front-end architecture. More specifically, the invention is related to an analog front-end integrated circuit, which solves problems associated with high-speed data communications by utilizing a combination of analog preprocessing and digital post-processing.

BACKGROUND OF THE INVENTION

With the advancement of technology, and the need for instantaneous information, the ability to transfer digital information from one location to another, such as from a central office (CO) to a customer premises (CP) has become more and more important. Allowing for increasing data transmission rates has, in fact, become a requirement, as opposed to an option.

In a digital subscriber line system (DSL), data is transmitted from a CO to a CP via a transmission line, such as a two-wire pair, and transmitted from the CP to the CO as well, either simultaneously or at different sessions. The same transmission line might be utilized for data transfer by both sides or the transmission to and from the CO might occur on two separate lines. The CO is basically comprised of a digital signal processor (DSP) which receives information from a data source and sends information to an analog front-end (AFE). The AFE interfaces between an analog line, such as the two-wire pair, and the DSP and functions to convert digital data, from the DSP, into a continuous time analog signal.

The analog signal is delivered, via a line driver, which is separate from the AFE, in accordance with the amount of power required to drive the amplified analog signal through the two-wire pair to the CP. A hybrid, which is located at both the CP and CO, is used to de-couple the received signal from the transmitted signal, by subtracting the transmitted signal from the sum of the transmitted and received signals. The AFE then converts the received analog signal into a digital signal, which is then transmitted to a DSP. Finally, the digital information is transmitted to the data source specified to receive such information.

As an important part of the abovementioned system responsible for proper transmission and reception of data in a broadband network, the AFE performs multiple functions in addition to converting a digital signal into a continuous time analog signal. However, the functionality of the AFE is particular to the specific DSL application considered, wherein factors such as signal bandwidth, data reach, signal quality, power budget, line power, and different applicable standards determine the optimum AFE. Unfortunately, due to the vast number of DSL applications available, including, but not limited to, HDSL, ADSL, MSDSL, 2B1Q HDSL and RADSL, it has been necessary to purchase separate individual AFEs to perform the functions necessary for each individual DSL application enumerated. Therefore, as an example, if a broadband network were to function on HDSL and ADSL applications, two separate AFEs would have to be purchased and implemented, specifically, one for HDSL applications, and one for ADSL.

Considering the many flavors of each DSL application, this problem becomes even more apparent. Limiting to only ADSL, currently there are eight main flavors on the market including DMT and CAP, light and heavy, FDM and echo canceled. For each one of these, the optimum solution is different on the CP and CO, so ideally 16 different AFEs are needed simply to cover the ADSL market. This necessity for separate AFEs has led to excessive cost in maintaining an adaptable CO or CP.

SUMMARY OF THE INVENTION

In light of the foregoing, the invention is an AFE, having an internal hybrid and line driver, that accommodates all DSL applications in a power efficient manner, by switching specific blocks on and off within the AFE, and configuring these blocks optimally for a given DSL application.

In general, one embodiment of the invention provides for an AFE, having a line driver and hybrid provided therein, which provides numerous functions, in order to provide a close to optimum solution for all DSL applications. The functions provided for by the AFE include; programmable hybrid attenuation; onboard amplifiers for driving external transmit and receive filters; a line driver with programmable drive and gain; programmable RC-filters capable of calibration via an internal loop-back under digital control; programmable switched-capacitor (SC) filter for tracking the over sampling rate used by a digital signal processor; internal testing functions; a high frequency boost circuit; a dual input peak detector; selectable data rates; and a programmable data interface. The AFE allows for the exclusive use of specific blocks within the AFE which are used in the performance of functions necessary to be applied by the AFE for the particular DSL application addressed, thereby not using unnecessary blocks and saving power.

The invention has numerous advantages, a few of which are delineated hereafter as examples. Note that the embodiments of the invention, which are described herein, possess one or more, but not necessarily all, of the advantages set out hereafter.

One advantage of the invention is that it provides a low cost solution to providing an AFE, which will function on all DSL applications.

Another advantage is that, while it provides a single AFE for all DSL applications, it does not use large amounts of power since specific unused blocks of the AFE may be turned off when not in use.

Another advantage is that it compensates for the effect of process variations by calibration under digital control.

Other objects, features, and advantages of the present invention will become apparent to one of reasonable skill in the art upon examination of the following drawings and detailed description. It is intended that all such additional objects, features, and advantages be included herein within the scope of the present invention, as defined by the claims.

DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale.

DETAILED DESCRIPTION

Figure 1:
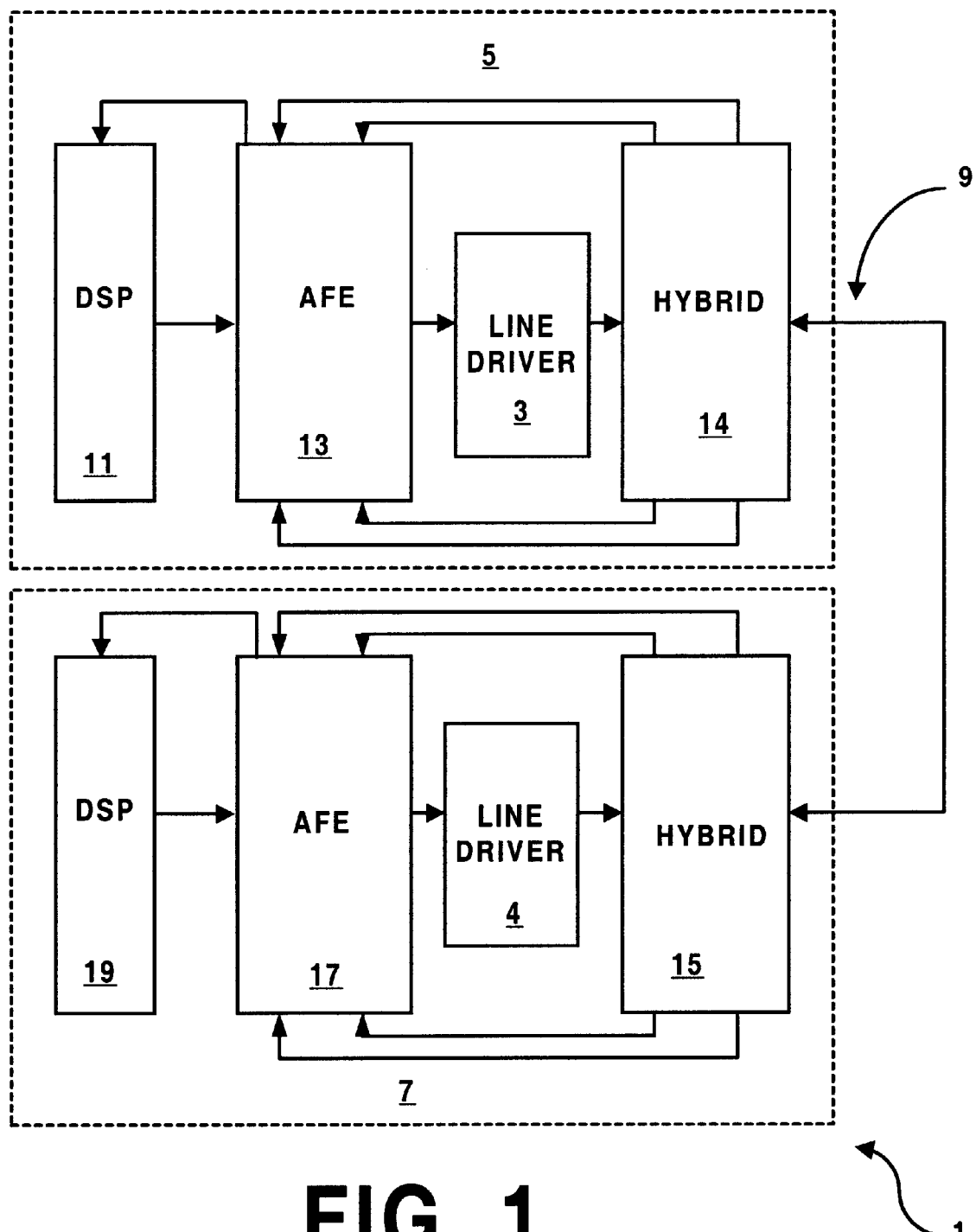
FIG. 1 is a prior art top-level representation of a typical digital subscriber line system utilizing an analog front-end, which is separate from a line driver and a hybrid.

Turning now to the drawings, wherein like referenced numerals designate corresponding parts throughout the drawings, FIG. 1 shows a prior art top level representation of a typical DSL system 1 utilizing an AFE which is separate from a line driver and a hybrid. The DSL system 1 illustrates transmission of data from a CO 5 to a CP 7 via a transmission line 9, such as, but not limited to, a two-wire pair, and transmission of data from the CP 7 to the CO 5. With regard to the present illustration, transmission of data may be directed from the CP 7 to the CO 5, from the CO 5 to the CP 7, or in both directions simultaneously. Further, transmission of data can either flow on the same line in both directions, or on separate lines, one in each direction.

The CO 5 includes a line card that includes a DSP 11, which receives information from a data source and sends information to an AFE 13. The AFE 13 interfaces between an analog line, such as, but not limited to, the two-wire pair 9, used for signal transmission, and the DSP 11, and functions to convert digital data, from the DSP 11, into a continuous time analog signal.

The analog signal is delivered, via a line driver 3, in accordance with the amount of power required to drive the amplified analog signal through the two-wire pair 9 and to the customer premises 7. The hybrid 15, located in the CP 7, is then used to de-couple the received signal from the transmitted signal, by subtracting the transmitted signal from the sum of the transmitted and received signals. The AFE 17, located in the CP 7, then converts the received analog signal into a digital signal, which is then transmitted to a DSP 19 located in the CP 7. Finally, the digital information is transmitted to the data source specified to receive the information.

If however, an analog signal is delivered from the CP 7 to the CO 5, line driver 4 will deliver the signal in accordance with the amount of power required to drive the amplified analog signal through the two-wire pair 9 and to the CO 5. A hybrid 14, located in the CO 5, is then used to de-couple the received signal from the transmitted signal, by subtracting the transmitted signal from the sum of the transmitted and received signal. The AFE 13, located in the CO 5, then converts the received analog signal into a digital signal, which is then transmitted to DSP 11 located in the CO 5. Finally, the digital information is transmitted to the data source specified to receive the information.

Figure 2:
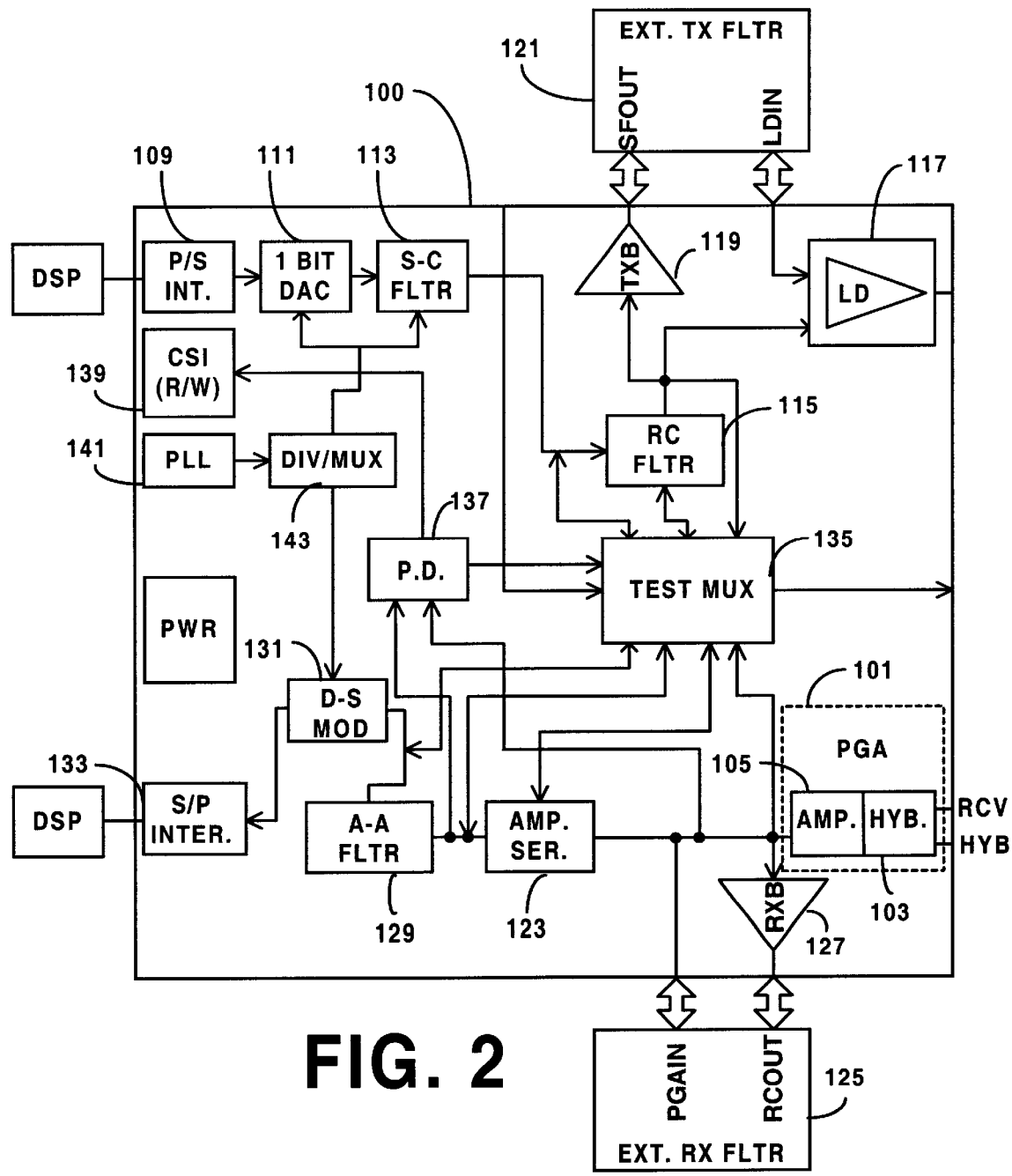
FIG. 2 is a block diagram that depicts an analog front-end circuit in accordance with the preferred embodiment of the invention.

Referring now to FIG. 2, an AFE 100 in accordance with the preferred embodiment of the invention is illustrated. Typically, an AFE 100 is separate from the line driver and hybrid, adding to the amount of circuitry necessary to accommodate for the transmission and reception of analog digital information. In accordance with the preferred embodiment of the invention, numerous functions, as shall be described in detail hereinbelow, are performed by the AFE 100 in order to provide a close to optimum solution for all DSL applications. In addition, the efficiency of the AFE 100 is improved by providing the line driver and hybrid therein, as shall also be described hereinbelow.

Programmable Hybrid Attenuation

One feature provided by the present AFE 100, relates to programmable hybrid attenuation with hybrid location internal to the AFE 100. In accordance with FIG. 2, programmable hybrid attenuation is provided by a programmable gain amplifier (PGA) 101. PGA 101 comprises a hybrid portion 103 and an amplifying portion 105 and at least two input ports, including a receive-port and a hybrid-port. It should be noted that the number of hybrid and receive ports in PGA 101 may vary according to technical specifications. The receive-port receives data from a CO or a CP, wherein the received data signal may be coupled with a transmitted signal. The hybrid-port receives the transmit-signal.

The hybrid portion 103 of PGA 101 is then used to de-couple the received signal from the transmitted signal, by subtracting the transmitted signal from the sum of the transmitted and received signals. In accordance with the preferred embodiment, removal of the transmitted signal from the received signal is performed by adjusting the gain of the transmit-signal, otherwise referred to as hybrid gain, until the difference of what is received on the receive-port, minus the transmit-signal, is as small as possible. The optimum hybrid gain is a function of the line impedance, which can vary significantly depending upon line conditions, such as bridge taps and wet lines. The achievable hybrid rejection, which measures how well the transmit-signal is rejected from the receive-signal, can thus be significantly improved.

The resulting receive-signal is then amplified by the amplifying portion of PGA 101 until the receive-signal plus non-attenuated transmit-signal becomes full scale. Typically, the available gain that can be implemented in PGA 101 is determined by the hybrid rejection, since the transmit-signal is significantly stronger than the receive-signal, and the signal out of the hybrid 103 is dominated by the transmit-signal. Thus, the required resolution of the receive path, tracks the hybrid rejection inversely. The receive-path needs to be able to recover the receive-signal as well as what is left of the transmit-signal. Once the data enters a DSP 104, the DSP 104 may be used to subtract the remains of the transmit-signal in the digital domain.

Onboard Amplifiers for Driving External Transmit and Receive Filters

In a broadband network two schemes are available for the transmission of digital data over a two-wire pair. The first of these schemes allows for the transmission and reception of data in the same frequency band. This scheme is otherwise referred to as full echo cancellation. As is known by one of reasonable skill in the art, filtering cannot be provided for in the aforementioned scheme, due to a lack of being able to separate transmitted and received data, since both use the same frequency band.

The second of these transmitting schemes transmits and receives data on different frequency bands. This scheme is otherwise referred to as frequency division multiplexing (FDM). Therefore, the use of external filtering is an effective method of separating received and transmitted data.

In accordance with the preferred embodiment of the invention, the AFE 100 reconfigures itself so that it can either use external filters or not, based upon whether the transmission and reception of data is being performed in the same bandwidth.

According to the transmission path of the AFE 100, a digital signal for transmission via the two-wire pair is first transmitted from a DSP to the AFE 100 via a parallel/serial interface 109. The parallel/serial interface 109 may receive data at a rate of, for example, four (4), two (2), or one (1) bits per period. The reception of data may be from any other input/output port, such as, but not limited to, a universal serial bus. A one bit DAC 111 generates a pulse waveform based upon the data received from the parallel/serial interface 109, which is then transmitted to a switched-capacitor filter 113. The switched capacitor filter 113 changes the digital data signal into an analog signal by plotting discrete points of the digital information, which is then smoothened by an active-RC smoothing filter 115.

The output of the smoothing filter 115 can either go directly to the line driver 117, as in the case when both the transmission and reception of information is performed in the same bandwidth, or to an external transmit filter 121, as in the case when transmission and reception of data is performed in different bandwidths. In accordance with the present invention, a transmit-buffer 119 drives the external transmit filter 121. The drive capability of the transmit buffer 119 is programmable in order to have an optimum drive for the filter it is required to drive. The required drive is a function of the nature of the external transmit filter 121, which is different for the various FDM applications, such as CAP ADSL or DMT ADSL.

If the analog signal is transmitted to the external transmit filter 121, the external transmit filter 121 cleans out-of-band noise and distortion from the transmit-frequency band which falls into the receive-frequency band. As an example, if the frequency band allocated for transmission of the analog signal encompasses the range of 50 to 200 kHz and the frequency band allocated for reception of the analog signal encompasses the range of 201 to 400 kHz, the filter, driven by the transmit buffer 119, filters out the transmit-signal located in the range of 201 to 400 kHz.

In accordance with the preferred embodiment of the invention, the frequency band allocated for transmission and reception of the analog signal may be predefined by a standards body or programmable at the discretion of a service provider. Typically, the CP transmits in a low frequency band to the CO, implying the transmit-filter buffer 119 drives a low pass filter, while the CO transmits in the upper portion of the band, implying the transmit-filter buffer 119 drives a high pass filter.

After filtering is performed by the external transmit filter 121, the analog signal is transmitted to the line driver 117. The line driver 117 may then drive the analog signal to the two-wire pair.

In accordance with the receive path of the AFE 100, if transmission and reception of data is performed in the same frequency band, the received signal, after being decoupled from the transmit-signal by the hybrid 103 and amplified by the amplifying portion 105 of PGA 101, as explained hereinabove, is transmitted to a series of amplifiers 123, as shall be described hereinbelow.

If transmission and reception of data is performed at separate frequency bands, the amplified receive-signal is attenuated by an external receive filter 125, which is driven by a receive buffer 127. After attenuation, the attenuated receive-signal is transmitted to a series of PGAs 123 for further amplification of the attenuated receive-signal. Anti-aliasing is then performed upon the amplified receive-signal by an RC anti-aliasing filter 129. Finally, the receive-signal is converted to a digital signal by a delta-sigma modulator 131, after which the receive-signal is transmitted to a DSP via a serial/parallel interface 133.

Linae Driver with Programmable Drive and Gain

In accordance with the preferred embodiment of the invention, line driver 117, having programmable drive and gain, is implemented within the AFE 100. An example of a possible implementation of the internal line driver 117 is described in the copending commonly assigned application entitled, "Line Driver Architecture with Programmable Gain and Drive," by Larsen et al., filed on even date herewith, and assigned Ser. No. 09/384,671, the disclosure of which is incorporated herein by reference in its entirety.

The line driver 117 is defined by an input stage and an output stage. The input stage of the line driver 117 is identified by the deriving of the open loop gain of a preamplifier. The output stage is defined by the deriving of the open loop gain of two drivers that provide the power required for the line driver 117 to drive the two-wire pair cable. Both, the preamplifier of the input stage, and the drivers of the output stage, have inputs that sit at a common mode voltage, thereby inhibiting a common mode input voltage swing and limiting distortion in the line driver 117.

The closed loop gain of the line driver may be changed to a desired value by regulating the values of resistors therein, thereby providing for the obtaining of a desired gain, regardless of whether the gain value is below or above 1. The open loop gain of the preamplifier may be changed to a desired value by regulating the values of the source degeneration resistors therein, thereby providing for the obtaining of the minimum achievable distortion for a given load driven. The drivers of the output stage use a set of programmable output devices to allow for maximum drive capability of the drivers to be programmed under digital control. Digital programmability of the output drive allows the line driver 117 to be reconfigured by digital control, so as to provide for the driving of the two-wire pair cable, regardless of unexpected impedances, such as a bridge tap.

Programmable RC-Filters Capable of Calibration via Internal or External Loop-back under Digital Control In accordance with the preferred embodiment of the invention, the AFE 100 has implemented therein, a means of internally enabling calibration of the cut-off frequencies of the active-RC smoothing filter 115 and the RC anti-aliasing filter 129. The use of methods external to an AFE 100, for calibrating filters internal to the AFE 100 has been undesirable due to use of a customer's line for calibration. Use of the line, for calibration purposes, causes additional traffic on a line which otherwise was used exclusively by a customer. Also, there are stringent restrictions with respect to what signals a service provider is allowed to put on a line, and these may not match the required signal to be monitored during calibration. Therefore, an internal method of filter calibration is made possible by the present AFE 100, in addition to the previously mentioned external one.

In accordance with the preferred embodiment, the output of the active-RC smoothing filter 115 is transmitted to the line driver 117, which, in turn, is transmitted to the line and fed back into PGA 101. In order to prevent the hybrid 103 from rejecting the transmitted signal, the programmable hybrid gain should be set to zero, in order to feed all the transmitted signal into the receive port without subtraction of the transmit-signal. After reception of the calibration signal by PGA 101, and either, direct amplification by the amplifier series 123 or amplification by the amplifier series 123 after external filtering by the external RX filter 125, the calibration signal is received by the RC anti-aliasing filter 129 and the cutoff frequency of the RC anti-aliasing filter 129 may be adjusted accordingly to maintain the receive-signal at the desired bandwidth. During calibration of the anti-aliasing filter 129 the cut-off frequency of the active-RC smoothing filter 115 is maximized so that the monitored frequency response is solely determined by the cut-off frequency programmed in the anti-aliasing filter 129. The cut-off frequency can then be digitally calibrated until the response is as desired. Similarly, the cut-off frequency of the transmit active-RC smoothing filter 115 can be monitored and adjusted keeping the corner frequency of the anti aliasing filter 129 at the maximum value, such that the frequency response of the total signal path is determined by the frequency response of the active-RC smoothing filter 115 in the transmit path.

The actual cut-off frequency of any continuous time RC filter may inversely track the RC product of a given process, where R is the resistance value of the resistor used in the filter, and C is the capacitance value of the capacitor used in the filter. Across processing, the value of R and C will typically vary by about 25%, which implies the accuracy of integrated RC filters are either, not very high, or need to be trimmed or tuned. Inaccurate values lead to less rejection of unwanted signals, and trimming adds cost due to extra silicon, mask-layers, and test time. Thus, calibration under digital control, while not necessary, is very attractive since it enables the user to tune the cut-off frequency to eliminate any process variations. Also, this feature enables the same filter to be used for a large range of cut-off frequencies, making it suitable for a larger span of DSL applications.

Alternatively, the calibration signal may be inserted directly into the receive path without going out to the line driver 117. Thus, the calibration signal will not be applied to the line, interrupting other services. Using the test MUX 135, the output of the transmit active-RC smoothing filter 115 could be sent back into PGA 101 or the RC anti-aliasing filter 129 and the response again monitored at the output of the delta-sigma modulator 131.

In accordance with the preferred embodiment of the invention, the cutoff frequencies of the active-RC smoothing filter 115 and the RC anti-aliasing filter 129 may be measured one at a time and calibrated one at a time. The measuring of one filter allows a user to know which way the process is skewed, and therefore, accurately predict how the other filter needs to be programmed for the intended response. Alternatively, the cutoff frequency of one filter could be measured and this information simply used to program the other accordingly.

Switched Capacitor Filter with Programmable Over Sampling Ratio

When a data signal is transmitted from a DSP to the AFE 100, the DSP encodes the data with a delta/sigma modulator to enable generation of high resolution waveforms in the AFE 100. During encoding there is the inherent capability of trading off signal bandwidth versus signal resolution by selecting the appropriate over sampling ratio. As an example, if the sigma delta modulator samples at 64 MHz, a signal bandwidth of 1 MHz may be used with an over sampling rate (OSR) of 32, or a signal bandwidth of 500 kHz may be used with an OSR of 64. Selecting the higher OSR would significantly improve the signal quality up to 500 kHz, while significantly degrading the signal quality from 500 kHz to 1 MHz. Thus, it is important to select the OSR in accordance with the different DSL applications and various bandwidths confronted by the AFE 100.

Therefore, in accordance with the preferred embodiment of the invention, the switched capacitor filter 113 contains a programmability feature which tracks the OSR utilized by the DSP and adopts the cut-off frequency of the switched capacitor filter 113 accordingly. In order to take full advantage if this feature, the cut-off frequency of the switched capacitor filter 113 tracks the inverse of the OSR according to the following equation:

$$BW = \frac{F_S}{2 \cdot OSR}$$

where $F_s$ is the sampling frequency, OSR is the over sampling ratio of the DSP, and BW is the bandwidth allocated for the data signal, or cut-off frequency of the switched capacitor filter 113.

Once the DSP over sampling ratio is known, the same over sampling ratio is used in the switched capacitor filter 113 to cut signals above the frequency given, thereby increasing the resolution of signals within the bandwidth used for the data signal.

Internal Test Functions

A test MUX 135 is located within the AFE 100 for purposes of providing direct paths throughout the AFE 100, thereby bypassing other paths throughout the AFE 100 when not in use. While the applicability of the test MUX 135 is discussed with reference to multiple functions herein, it is necessary to note that the test MUX 135 also provides a means of applying an external signal into any particular node within the AFE 100. Further, internal signals from the AFE 100 may be read or transmitted externally by requesting specific node information from the test MUX 135. Generally, the test MUX 135 works by connecting any predefined internal node or an external input to any other predefined internal node while monitoring the response in any other predefined internal node by feeding this node to an external pin which is monitored.

High Frequency Boost Circuit

When a transmitted signal is received by the AFE 100, PGA 101 amplifies both, high and low frequencies of the received signal. However, it is a well know fact that after transmission of a signal through a two-wire pair, lower frequencies of the transmitted signal are attenuated very little while higher frequencies are attenuated to a much higher degree. As such, the preferred embodiment of the invention provides for a high frequency boost option.

The final amplifier in the series of amplifiers 123 increases the high frequency spectrum of the received signal by amplifying the high frequency as predefined by a user. For some DSL applications and conditions this is desirable, while for others it is undesirable since the added high frequency boost might add too much noise. As a result, the preferred embodiment of the invention provides a programmable high frequency boost circuit so that the frequency response of the path can be tuned according to applications and conditions.

Dual Input Peak Detector

In accordance with the preferred embodiment of the invention, the gain of the PGAs may be adjusted so that amplification provided to the received data signal will be limited to a specific, predefined, magnitude, or voltage, thereby pre-setting the desired peak-to-peak voltage out of the delta-sigma modulator 131. This feature is desirable since amplification of the receive-signal over a certain peak may cause clipping, and therefore, loss of data. Amplification over the peak may take place either after amplification by PGA 101, or following amplification after the series of amplifiers 123.

To address the aforementioned problem, the present AFE 100 provides a dual input peak detector 137 having a first input connected to the output of PGA 101 and a second input connected to the output of the series of amplifiers 123. The output of the dual input peak detector 137 is connected to a control serial interface 139, thereby providing a means of detecting the signal magnitude at either point by comparing it to a predefined programmable trip point set under digital control. The DSP first monitors the output of PGA 101 and increases the gain of PGA 101 until its magnitude reaches a preset level. The output signal is then fed to the receive-filter buffer 127, and further attenuated by an external receive filter 125, which reduces the near end transmit-signal. Once the receive-signal goes back on chip, the DSP adjusts the gain in the remaining amplifier series 123 until the output magnitude of the entire series 123 is again at the desired level.

Since the external receive filter 125 attenuates the transmit portion of the receive-signal, it is not possible to set the gain of PGA 101 simply by monitoring the delta-sigma modulator 131 output. Therefore, the gain in PGA 101 is typically set conservatively low, to ensure no clipping, which increases the overall noise figure of the receive path. This yields non-optimum performance of the receive path, and reduced reach for all FDM ADSL applications, where external receive filters are incorporated.

Selectable Data Rates

For purposes of preventing excessive power dissipation, it is desirable to perform analog to digital conversion at a different sampling rate than digital to analog conversion if the receive and transmit bandwidths are different. As an example, if transmission of data is performed at high frequencies, while reception of data is performed at low frequencies, the high frequency path should be sampled at a higher rate than the low frequency path. As such, the transmission and reception of data at the same sampling rate results in unnecessary use of power in the receive path.

As a result, in accordance with the preferred embodiment of the invention, analog to digital and digital to analog conversion may be performed at different clock speeds. A clock transmits the clock speed to a phase-locked loop 141, which synchronizes the AFE 101 with the DSP 104 as well as a far end, wherein a far end may be, but is not limited to, an external customer premises or central office. A divider/MUX 143 receives the clock speed from the phase-locked loop 141 and provides appropriate sampling rates to the 1 bit DAC 111 and switched-capacitor filter 113, as well as the delta-sigma modulator 131. It should be noted that one of reasonable skill in the art will appreciate that assignment of appropriate sampling rates need not be performed by a MUX, but instead, may be performed by other digital control logic.

To illustrate use of the divider/MUX 143, the following example is provided. If the clock speed going into the phase locked loop 141 is 80 MHz, and the transmission of data is performed at a higher frequency than the reception of data, the divider/MUX 143 may assign clock speeds of the 1-bit DAC 111 and switched-capacitor filter 113 to be at 80 MHz, while assigning the delta-sigma modulator 131 to run at 40 MHz. Alternatively, if the reception of data were performed at a higher frequency than the transmission of data, the divider/MUX 143 may assign clock speeds of the 1-bit DAC 111 and switched-capacitor filter 113 to be at 40 MHz, while assigning the delta-sigma modulator 131 to run at 80 MHz.

It should be noted that ratios of powers of two have been chosen here between the delta-sigma modulator 131 and 1 bit DAC 111 clock for simplicity, since these can be generated with a simple digital divider. This might, however, not be a requirement if more elaborate digital logic was used, or a higher PLL clock 141 implying larger divisor ratios.

Programmable Data Interface

For DSL applications, where the data rate can vary over several orders of magnitude, it is desirable to have the ability to select how many bits you would like to transfer in parallel based on the application at hand. As such, for high speed applications, the parallel/serial interface 109 is utilized by the preferred embodiment of the invention at the input, thereby grouping inputted data into, for example, a four bit data group, which the AFE 100 is programmed to accept in parallel. However, for low speed applications, the parallel serial interface 109 may be programmed to accept two bits in parallel, or a single bit at a time.

As an example, for high speed applications, the parallel/serial interface 109 may be required to operate the delta-sigma modulator 131 or 1 bit DAC 111 at rates close to 100 MHz, and it is desired to ship the data to the DSP in parallel at a slower rate. This simplifies I/O design, reduces digital noise, as well as reducing potential EMI related problems.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Further, since one of ordinary skill in the art would readily appreciate and understand the circuitry necessary to implement the features of FIG. 2, the block diagram supplied is a sufficient representation of the preferred embodiment of the invention. Also, alternative physical representations may be used in implementing the functions of FIG. 2, without differing from the nature of the multi-mode analog front-end.

What is claimed is:

1. A method of accommodating different digital subscriber line applications by a single analog front-end circuit, comprising the steps of:

driving a line;

attenuating said transmit signal from said receive signal upon reception of said receive signal;

amplifying said attenuated receive signal;

changing a data rate of said analog front-end circuit dependent upon said different digital subscriber line applications; and dividing a clock signal for use by said analog front-end circuit, such that converting a first analog signal into a first digital signal may be performed at a different sampling rate than converting a second digital signal into a second analog signal.

2. The method of claim 1, wherein said line is a two-wire pair.

3. The method of claim 1, wherein said step of amplifying said attenuated receive signal is defined by a peak detector which predefines a maximum amount of amplification.

4. The method of claim 1, further comprising the step of externally filtering a transmit signal and a receive signal if said transmit signal and said receive signal are on a different frequency band.

5. The method of claim 1, further comprising the step of calibrating said analog front-end circuit internal to said analog front-end circuit.

6. The method of claim 1, further comprising the step of amplifying a portion of said receive signal, wherein said portion has a high frequency.

7. The method of claim 1, further comprising the step of driving external filters, which perform said step of externally filtering said receive and said transmit signals.

8. The method of claim 1, wherein said line is a two-wire pair.

9. The method of claim 1, further comprising the step of further amplifying said amplified attenuated receive signal until said receive signal is capable of being used by a digital signal processor.

10. The method of claim 1, further comprising the step of tracking an over sampling ratio of a digital signal processor, thereby providing optimum performance of a wide range of bandwidths used by said transmit signal.

11. A multi-mode analog front-end integrated circuit for digital subscriber line applications, comprising:

a line driver formed in a portion of the integrated circuit and disposed to transmit signals to a local loop;

a programmable gain amplifier formed in a portion of the integrated circuit, operatively coupled to the line driver, and disposed to receive signals from the local loop, the programmable gain amplifier including a hybrid portion configured to de-couple the received signals, the programmable gain amplifier further including an amplifier portion, wherein the programmable gain amplifier is configured to remove transmitted signals from the received signals by adjusting a gain of the hybrid.

12. The multi-mode analog front-end integrated circuit of claim 11, further including a testing device for monitoring and rerouting an internal analog signal within said analog front end to at least one port.

13. The multi-mode front-end integrated circuit of claim 11, further comprising a programmable data interface, wherein said interface changes a data rate at which said analog front-end circuit receives data from a digital signal processor.

14. A multi-mode analog front-end integrated circuit for digital subscriber line applications, comprising:

a line driver formed in a portion of the integrated circuit;

a hybrid formed in a portion of the integrated circuit and operatively coupled to the line driver; and at least two components selected from the group consisting of: an amplifier for amplifying a signal received by the hybrid, a digital to analog converter, an analog to digital converter for converting the amplified receive signal, a clock signal divider for dividing a clock speed for the analog front-end integrated circuit allowing said analog to digital conversion and said digital to analog conversion to be performed at different clock speeds, and a switched capacitor filter having a programmable cut-off frequency which tracks an over sampling ratio utilized by a digital signal processor; and a digital control interface configured to switch on and off the at least two components.

* * * * *